April 9, 1940.  M. LEE  2,196,964
INSULATED LIVE LINE TAP-OFF CONNECTOR
Filed April 18, 1938   3 Sheets-Sheet 1
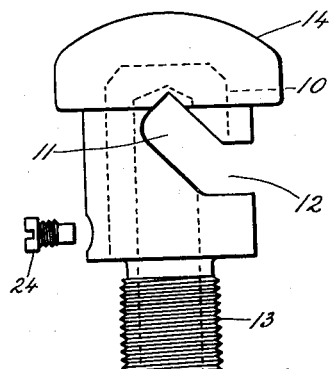
Fig. 3
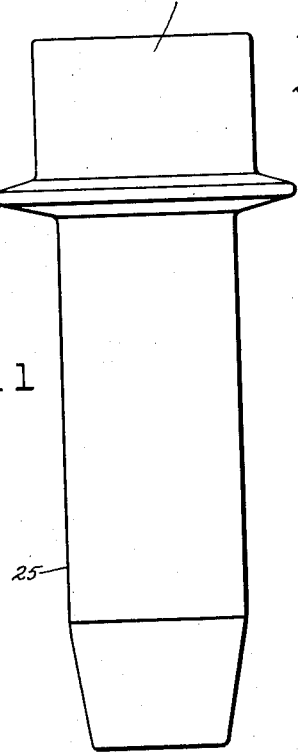
Fig. 1
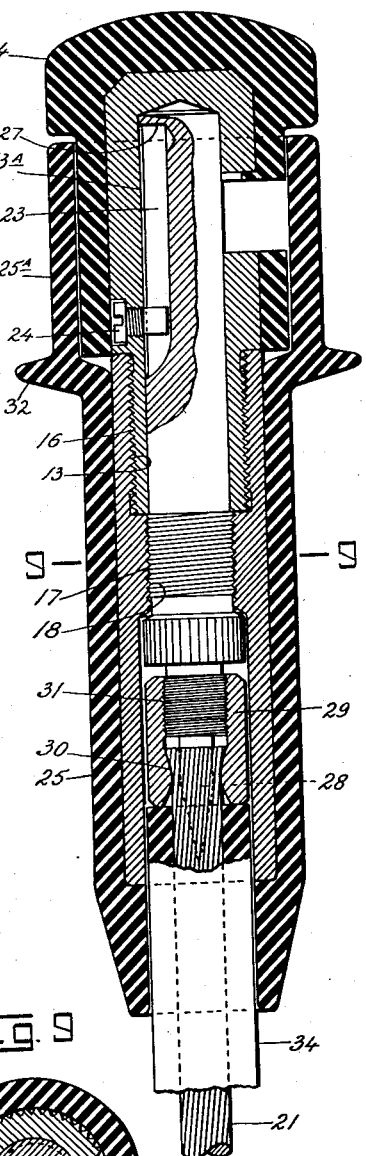
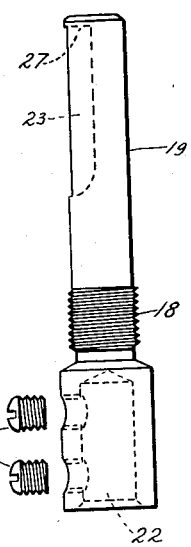
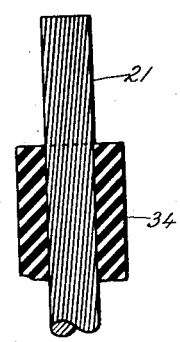
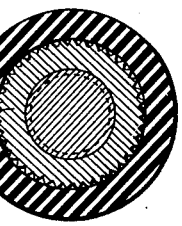
Fig. 9
INVENTOR.
MARVIN LEE
BY Harry Ernest Rubens
ATTORNEY.

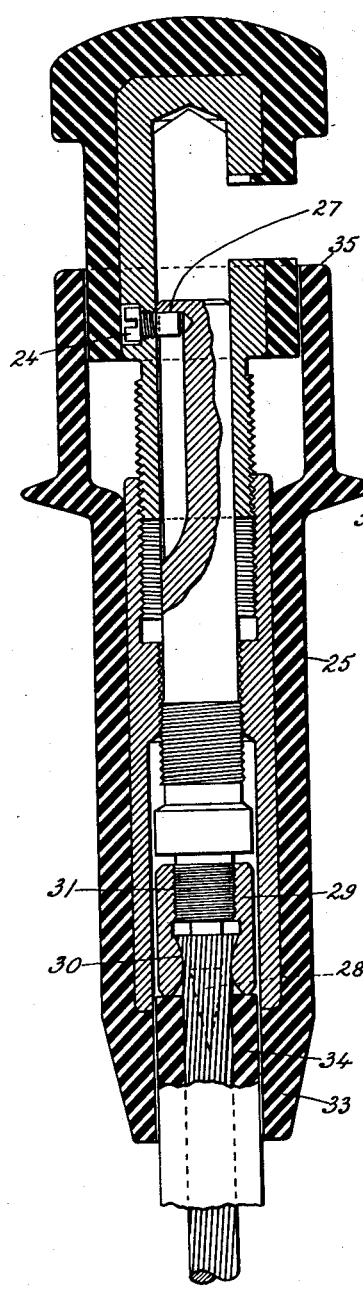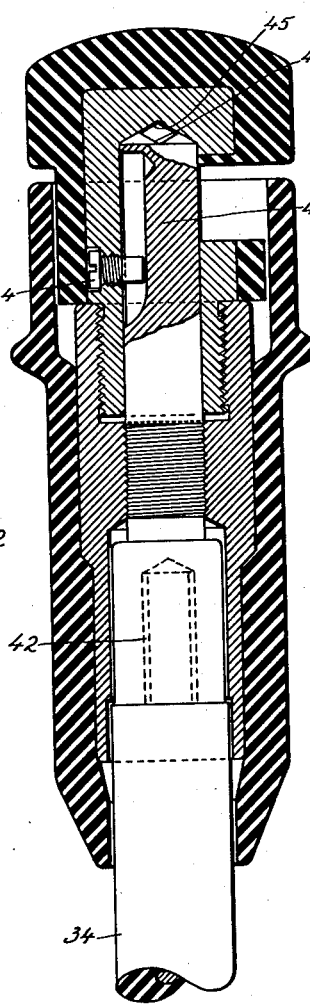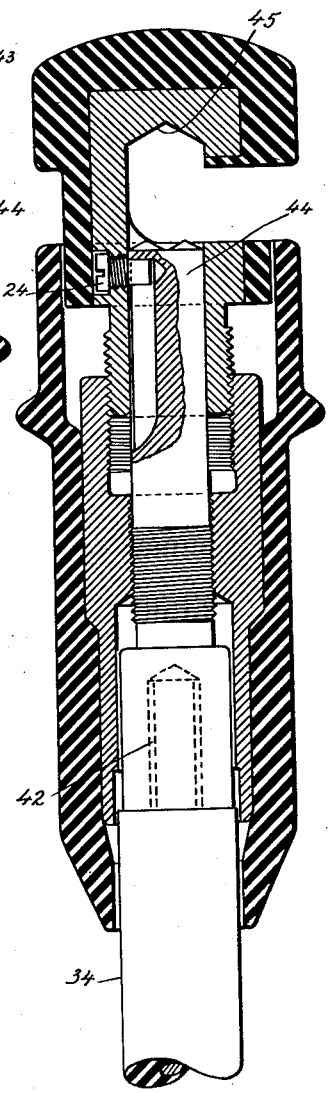

April 9, 1940.  M. LEE  2,196,964
INSULATED LIVE LINE TAP-OFF CONNECTOR
Filed April 18, 1938  3 Sheets-Sheet 3
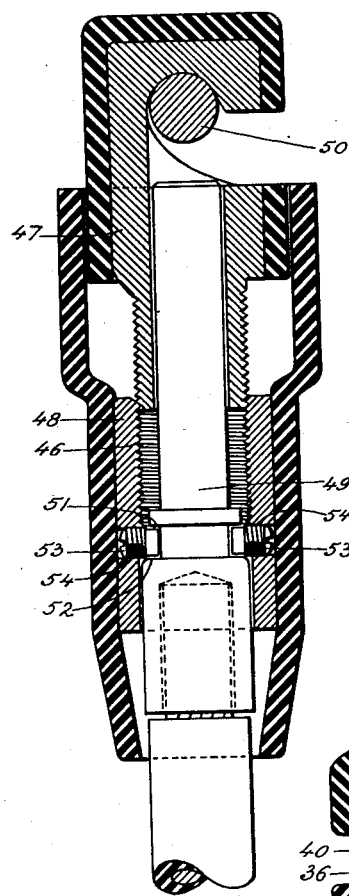
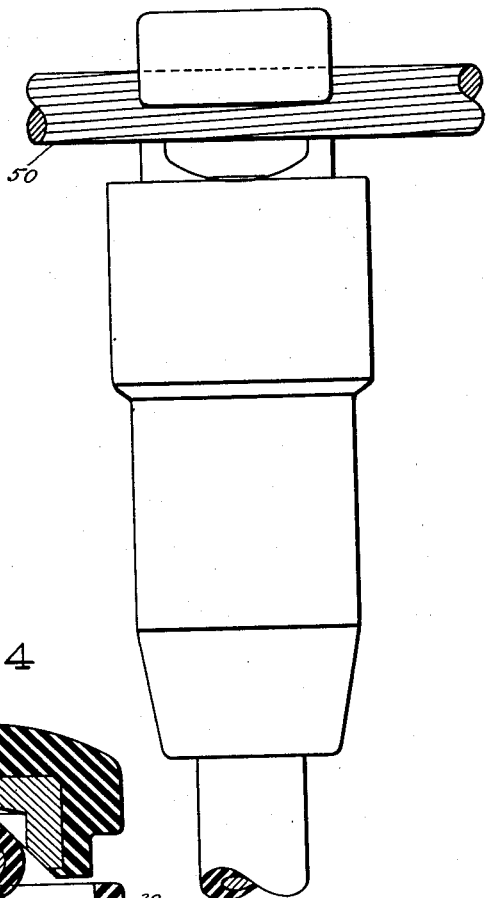
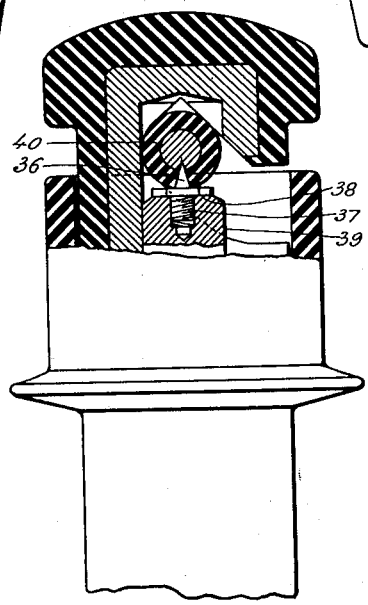
INVENTOR.
MARVIN LEE
BY Harry Ernest Rubens
ATTORNEY.

Patented Apr. 9, 1940

2,196,964

UNITED STATES PATENT OFFICE 2,196,964

INSULATED LIVE LINE TAP-OFF CONNECTOR

Marvin Lee, Rye, N. Y., assignor to Burndy Engineering Co. Inc., a corporation of New York Application April 18, 1938, Serial No. 202,642

6 Claims. (Cl. 173—273)

This invention relates to devices for tapping current from a line electric cable without disturbing the circuit while the connection is being made.

It is often necessary to make repairs on electrical equipment which is in a live circuit and to do this without discontinuing service to the customers served by the circuit. Thus, for example, a switch might have a defective insulator and the current would have to be by-passed around the switch while the repair was being made. By using two of the devices described herein connected by an insulated cable, connections can be made on either side of the faulty switch and the current thus carried around it, while a new insulator is installed. Many other similar examples can be cited such as:

By-passing defective street lighting equipment,
Making temporary secondary connections,
Grounding or shunting low voltage substation equipment,
Grounding distribution equipment,
Jumping power meters while testing, and
Making temporary connections while changing poles.

One object of my invention, therefore, is to provide a tap-off connector that can be used to make temporary or permanent connections from live lines.

Another object of my invention is to provide a connector that can be installed while the electric line is carrying current.

Another object of my invention is to provide a connection which is completely insulated after installation so that accidental contact by the workman will not be dangerous.

Still another object of my invention is to provide an insulated connector which has a hand guard to prevent the workman's hand from coming too close to the line conductor while it is being installed.

Other objects of my device are to make electrical contact with the live conductor without damaging or scoring the conductor; to provide a device which will make a connection to a live conductor rapidly and with a minimum amount of labor; to provide a solderless grip for the flexible insulated tap conductor which will be compact and secure; to provide an insulated connector with insulation that will not crack or break when dropped from pole tops, etc., and which may be readily replaced if it should ever become damaged or worn; and to accommodate a large range of run conductors.

I attain these and other objects and accomplish my novel results, by the device described in the following specification and claims and illustrated in the acompanying drawings, in which:

Fig. 1 is an exploded view of the device showing the constituent parts.

Fig. 2 is a longitudinal section showing one type in extreme open position.

Fig. 3 is a longitudinal section showing the same type in closed position.

Fig. 4 is a partial section showing a modified contact making head for a live insulated conductor.

Fig. 5 is a longitudinal section of another type in closed position.

Fig. 6 is a longitudinal section of the connector shown in Fig. 5 in extreme open position.

Fig. 7 is a longitudinal section of still another type in open position.

Fig. 8 is a front view of the same.

Fig. 9 is a cross-section of the connector shown in Fig. 3 taken through the line 9—9.

Referring to Fig. 1, which is an exploded view of my invention, the connector consists of a head portion 10 with a groove 11 and side opening 12 therein, for accommodation of the live conductor, and a threaded stem 13 having a hollow section 13A, protruding from the lower side. Over this head portion is fitted a soft, tough rubber insulating cap 14 which covers all parts except the threaded stem. Below the head is the hollow metal body portion 15 which has two threaded portions therein, 16 and 17, one 16 to fit on the threaded stem 13 of the head and the other 17 to fit on the threaded portion 18 of the plunger 19. The plunger 19 is threaded into the body and slides into the hollow 13A of the threaded stem 13, engaging the conductor. At its lower end, it has a plurality of set screws 20 for attaching the tap conductor 21 into socket 22, in a conventional manner. In the side of the plunger is a longitudinal groove 23, in which a screw 24, threaded through the head portion 10, rides. When the three parts are assembled, this screw 24 prevents the plunger 19 from rotating as it advances. Thus the advance of the plunger is the addition of two thread actions, 16—13 and 17—18, creating a movement of the body 15 advancing in the head 10 and that of the plunger 19 advancing in the body 15. In completing the assembly a rubber sleeve 25 is preferably drawn over the body 15 making a fully insulated connector.

Referring to Fig. 2, the connector is shown in cross-section, assembled and in extreme open position. In this position, only a small number of threads between head 10 and body 15, and plunger 19 and body 15 are in engagement. The screw 24 in the side of the head is at the top of the slot 23 in the plunger 19 and the stop 27 limits the vertical travel of the plunger 19. The upper section 25A of the insulating sleeve 25 surrounding the body, is at a level permitting the opening in the side of the head to be unobstructed for easy entrance of the live conductor, and has a diameter large enough to permit the free movement of the lower portion of the rubber insulator cap 14. Thus the entire connector is completely enclosed with rubber insulation at all times, as will be evidenced by an inspection of Figs. 2 to 8.

At the lower end of the plunger in Fig. 2 is shown a solderless arrangement for holding the flexible tap conductor 21. This arrangement consists of tapered pin 28 which fits between the strands of the end of the cable. A nut 29, with an internal taper 30 slightly less than that of the pin is then threaded on to the plunger as at 31 and the flexible cable is compressed between the pin 28 and the nut 29 as the nut advances. The cable is gripped securely by this mechanism, and can be easily disconnected whenever desired. Of course, any well-known type of solderless connection adaptable to the device may be used, as for example, the compressible cone type.

Molded integrally with the insulating sleeve 25 is a wide disc 32 which acts as a hand guard and prevents the workman from putting his hand too close to the live conductor. In addition, it increases the electrical leakage path to the workman's hand, an important factor on a wet day. Similarly, the lower end 33 of the sleeve 25 overlaps the insulation 34 of the tap conductor for a considerable extent in order to provide a long leakage path.

Fig. 3 shows the connector in fully closed position. As can be seen, both the threaded connections 16—13, and 17—18, have advanced to the full extent of the thread. This cumulative action results in a rapid advance of the plunger and means that fewer turns of the body are necessary for the connection to be made. It is important to note that the plunger 19 does not revolve as it advances, thus eliminating any scoring or damaging of the cable which might result from such rotation. The cumulative thread action is also designed to permit the plunger 19 to recede below the level 35 of the rubber sleeve 25 when the connector is in open position, as shown in Fig. 2.

Fig. 9 is a cross-section showing the way the insulating sleeve fits over the knurling 26 of the body 15 of the connector. The body is knurled in order to prevent any relative movement of sleeve 25 and body 15 as the connector is being tightened. The insulation of sleeve and head may be made detachable for replacement, if desired.

Fig. 4 shows an attachment which may be inserted in the top of the plunger where a connection needs to be made, to weather-proof or rubber insulated wires or cables. A sharp point 36 for penetrating the insulation is screwed, as at 37, into the top 38 of the plunger 39 and penetrates the insulation 40 making contact with the live conductor 41, within.

Figs. 5 and 6 show a smaller size of the same connector. This operates identically in principle with the previously described type, differing only in the provision of a solder socket 43 to accommodate the tap conductor. In this size, the top 43 of the plunger 44, as well as the groove 45 in the head is formed in the shape of a V in order to center the cables which may be of varying sizes.

Figs. 7 and 8 show a modified type, with a slightly different mechanism for advancing the plunger. Here there is only one threaded connection 46; that between the head 47 and the body 48. In order to advance the inthreaded plunger 49, and at the same time permit it to remain in a non-rotating relationship to the tap cable 50, the plunger is made with shoulders 51 and 52. These shoulders are engaged by three smooth pointed set screws 53 which are threaded as at 54 into the side of the body 48 at 120° angle. When the body 48 is manually rotated, it advances on the threaded stem of the head 47. The set screws 53 rotate with it, carrying the plunger 49 upwardly. The screws are permitted to rotate within the shoulders 51 and 53 allowing plunger 49 to move longitudinally without rotation. This type of connector is somewhat cheaper than that previously described but is not as efficient in operation.

Safety and convenience are stressed by the design of my novel device. No metal parts are exposed, either before or after installation, and the guard prevents accidental contact with the live line. The cumulative screw action enables the device to be installed in a minimum period of time. In addition, the contact is made by direct transverse pressure which will not nick or damage the conductor. The device is free from loose parts and will not break if accidentally dropped. By providing a special pointed contact member, connection may readily be established through an insulated conductor. The design readily permits tapping an endless conductor, and for a wide variety of temporary or permanent connections.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

What I claim and desire to secure by Letters Patent, is as follows:

1. A connector for transmitting current from one conductor to another comprising a substantially cylindrical metallic body section having a transverse slot for receiving one of the conductors and having a concentrically located aperture, longitudinally extending from the transverse slot to an externally threaded end of the body section; pressure engaging means mounted within the aperture for directly compressing the conductor within the body section; a manually operable internally threaded sleeve for actuating the pressure engaging means concentrically located therein; and means for electrically connecting the two conductors to each other by mounting the remaining conductor to the pressure engaging means.

2. A connector for transmitting current from one conductor to another comprising a substantially cylindrical metallic body section jacketed with insulating material having a transverse slot for receiving one of the conductors and having a concentrically located aperture longitudinally extending from the transverse slot to an externally threaded end of the body section; externally threaded pressure engaging means mounted within said aperture for directly compressing the conductor within the body section; a manually operable internally threaded sleeve with an insulating cover for actuating the pressure engaging means concentrically located therein; and means for electrically connecting the two conductors to each other by mounting the remaining conductor to the pressure engaging means.

3. A connector for transmitting current from one conductor to another comprising a substantially cylindrical metallic body section having a transverse slot for receiving one of the conductors and externally threaded at one end thereof with a concentrically located aperture longitudinally extending from the transverse slot through to the threaded end pressure engaging means mounted concentrically therein; an internally threaded sleeve for threaded engagement with the threaded end of the metallic body section; means for electrically connecting the two conductors to each other by mounting the remaining conductor to the body section in the longitudinal axis of the connector; said sleeve actuating the pressure engaging means concentrically located therein.

4. A connector for transmitting current from one conductor to another comprising a substantially cylindrical metallic body section having a transverse slot for receiving one of the conductors, and externally threaded at one end thereof with an axially formed aperture longitudinally extending from the transverse slot through to the threaded end; pressure means mounted within said aperture for compressing the conductor in the body section, terminating in a conductor terminal gripping means; an internally threaded sleeve for threaded engagement with said threaded body section; and means for non-rotatingly projecting said pressure means into said body section when said sleeve is rotated thereon.

5. A connector for transmitting current from one conductor to another comprising a substantially cylindrical metallic body section having a transverse slot for receiving one of the conductors, and externally threaded at one end thereof with an axially formed aperture longitudinally extending from the transverse slot through to the threaded end; pressure means mounted within said aperture for compressing the conductor in the body section, terminating in a threaded section with a conductor terminal gripping means extending therefrom; a sleeve having two sets of internal threads, one for engagement with the threaded end of the body section, the other for engagement with the threaded pressure means, whereby the rotation of the sleeve will propel the pressure means a distance equal to the sum of the two thread pitches; and means for preventing the rotation of the pressure means with respect to the body section.

6. A connector for transmitting current from one conductor to another comprising a substantially cylindrical metallic body section jacketed with insulating material having a transverse slot for receiving one of the conductors and having a concentrically located aperture longitudinally extending from the transverse slot to one end of the body section; pointed pressure engaging means mounted within said aperture for directly compressing and electrically connecting the pressure engaging means to the insulated conductor within the body section; a manually operable sleeve with an insulating cover for imparting a linear motion solely to the pressure engaging means concentrically located therein; and means for electrically connecting the two conductors to each other by mounting the remaining conductor to the body section in the longitudinal axis of the connector.

MARVIN LEE.